Patented Mar. 10, 1942

2,275,494

UNITED STATES PATENT OFFICE 2,275,494

REACTION PRODUCT

Harry Bennett, Woodmere, N. Y.

No Drawing. Application August 1, 1939,
Serial No. 287,747

5 Claims. (Cl. 260—410)

The invention relates to novel synthetic products or esters of polyhydric alcohols and organic acids having more than 5 carbon atoms to the molecule.

It has been proposed heretofore to make use of a somewhat polymerized polyhydric alcohol in the esterification, but the resulting ester, while possessing certain desirable properties not present in the usual form of ester derived from unpolymerized polyhydric alcohols, did not among other features possess the property of being soluble in water to provide a perfectly clear solution thereof; and it is an object of the present invention to provide an ester of a polyhydric alcohol possessing this desirable property. Other objects of the invention are to provide a novel product having the ability to act as an emulsifying agent and as a film-forming agent, and as a plasticizer; also, a product which possesses great foaming properties and is relatively stable with respect to the usual acids.

I have found that the ester may be modified to give it the aforesaid properties by the novel treatment hereinafter set forth which includes polymerizing the polyhydric alcohol to a molecular weight far beyond that heretofore contemplated and prior to esterification. Thus, while the number of free hydroxyls of the polyhydric alcohols remains the same, in other words its combining capacity with other reagents remains unchanged, its molecular weight is greatly increased so that only a relatively small amount of the reagent, as an organic acid, is required. For the ester to possess the desired properties, I have found that polymerization should proceed to an extent such that the molecular weight is increased to approximately 500 and preferably considerably higher, the degree of polymerization depending on the clarity of the aqueous solution desired.

The polymerization of the particular polyhydric alcohol utilized may be carried on in any well-known manner, and the method of effecting the same forms no particular part of the present invention, it being necessary only that it be carried to the extent noted.

Among the alcohols suitable for the production of the novel product are glycol (ethylene glycol) or compounds thereof such as diethylene or triethylene glycol or ethers of the same, as well as glycerol, polyglycerols, pentaerythritol, sorbitol, mannitol, their ethers, etc. As esterifying material, an organic acid is utilized which contains more than 5 carbon atoms to the molecule, for example, an acid such as stearic, myristic, lauric, linoleic, phthallic, abietic, citric, tartaric, malic, maleic, cresylic, etc. Substitution products of the acids where an atom or a radical other than the carboxyl group is replaced, are also suitable, for example, phenyl stearic acid.

As a typical example, glycol which has been polymerized to a molecular weight of 4000 is esterified with stearic acid in the proportions of 300 parts of the former to 20 parts of the latter, by weight. The two are heated together, for some 15 hours at a temperature of 160° C. and under atmospheric pressure. The reaction is conducted in the presence of a catalyst, in the amount of 1 part, and either acid or alkali. For example, such catalysts as sulphuric acid, hydrochloric acid, phosphoric acid, sodium glycerophosphate, sodium sulphate, bisulphite and tetraborate, calcium chloride, anhydrous boric acid, etc., are suitable for the purpose.

For polyhydric alcohols of lower polymerized molecular weight, the following proportions have been found suitable: glycol of a molecular weight of 1500, 147 parts; stearic acid, 52 parts; and phosphoric acid as a catalyser, ¾ of a part—all parts being by weight. The resultant product is a di-stearate rather than a mono-stearate as in the previous example.

In some instances, the final product may contain small amounts of free stearic acid, or other acids which may have been used in place of this acid, but will nevertheless afford a perfectly clear solution when dissolved in water.

I claim:

1. A reaction product consisting of a polymerized polyhydric alcohol of a molecular weight in excess of 500 and completely esterified with an organic acid containing more than 5 carbon atoms to the molecule, said product being soluble in water to provide a clear water solution thereof.

2. A reaction product consisting of a polymerized polyhydric alcohol of a molecular weight in excess of 500 and completely esterified with an organic acid of the higher members of the fatty acid series containing more than 5 carbon atoms to the molecule, said product being soluble in water to provide a clear water solution thereof.

3. A reaction product consisting of polymerized ethylene glycol of a molecular weight in excess of 500 and completely esterified with stearic acid.

4. A reaction product consisting of polymerized ethylene glycol of a molecular weight of 1500, 147 parts, and completely esterified with stearic acid, 52 parts, all parts by weight.

5. A reaction product consisting of 300 parts of polymerized ethylene glycol of a molecular weight of 4,000 and completely esterified with 20 parts of stearic acid, all parts by weight.

HARRY BENNETT.